Oct. 20, 1970 G. S. KANG 3,535,550

PULSE NORMALIZING EXPANDING OR COMPRESSING CIRCUIT

Filed July 11, 1967

GEORGE Su. KANG
INVENTOR

BY Ronald J. Kranzdorf
ATTORNEY

Referring to line B of FIG. 2, it can be seen that it is substantially easier to make these measurements when the pulses have first been normalized to a constant peak value. With normalized pulses of this type, all that is required is to record the time at which a predetermined 10%, 50%, 90% point of the pulse is reached and the time at which a predetermined peak value is reached. No storage or comparisons are required. It is also seen that the dynamic range over which the measuring and other components must respond has been reduced by at least 50% by the normalization procedure. For some measurements, such as those where a ratio between pulses is required, it may be desired to achieve a reduction in dynamic range of the inputs without normalizing all the pulses to a constant peak value. This may, for example, be accomplished by a pulse compression operation giving pulses such as those shown on line C of FIG. 2. The pulses on this line of FIG. 2 have had their amplitude reduced to 50% of that shown on line A of the figure, but have otherwise had no change in their characteristics. It should, at this point, be noted that a compressed pulse may be used as effectively as the original input pulse to measure any quantity involving time or any quantity involving a ratio of amplitudes. Further, since the compression ratio is known, the compressed pulses may also be used to measure amplitude values provided that the measured values are multiplied by the proper factor in order to obtain the true values.

The input pulses at terminal 10 are applied through line 12 to the inputs of both delay 14 and logarithmic amplifier 16. As will be seen later, the duration of delay 14 is at least as great as the rise time for the slowest rising pulse to be applied to terminal 10. The output from delay 14 on line 16 is applied to the input of field effect transistor (FET) amplifier 18. Amplifier 18 may be any field effect transistor amplifier, the gain of which is an exponential function of the control voltage applied to terminal 20. The signal on output line 22 from FET amplifier 18 is applied to output terminal 24 and is also applied as the input to end-of-pulse detection circuit 26.

Looking now at the control loop, logarithmic amplifier 16 may be any of a variety of devices which are capable of performing the desired transformation on input pulses. Output line 28 from amplifier 16 is connected to the inputs of peak detector 30 and hold circuit 32. As long as hold circuit 32 is not set, a capacitor, therein continues to charge through a forward-biased diode. The output on line 34 from hold circuit 32 represents the voltage level across the capacitor. When peak detector 30 detects that the peak of a given pulse has been reached, a signal appears on line 36 to back-bias the diode in hold circuit 32, thereby freezing the charge across the capacitor at its existing level. Once hold circuit 32 is set, the voltage on line 34 remains constant until hold circuit 32 is reset. Hold circuit 32 is reset by a signal on output line 38 from end-of-pulse detection circuit 26. The signal on line 34 is applied through post amplifier 40 and line 42 to control input 20 of amplifier 18. The gain of post amplifier 40 has a dual polarity and the magnitude of the gain can be varied, either manually or under automatic control, through gain control circuit 44 and line 46. As will be seen shortly, the gain of post amplifier 40 determines whether the circuit of FIG. 1 operates as a pulse compression circuit, a pulse normalizer, or a pulse expansion circuit.

The device of FIG. 1 accomplishes the desired pulse amplitude control by using the field effect transistor amplifier 18 as a linear gain device, the gain of which varies in accordance with the input peak amplitude to accomplish a power-law amplitude transformation. Amplitude normalization and amplitude compression or expansion are special cases of a power-law transformation.

A power-law amplitude transformation is defined as the process by which the output peak amplitude is the $r$th power of the input peak amplitude. Hence, the power-law transformation is expressed by $$e'_o = (e'_{in})^r \qquad (1)$$

where $e'_o$ is the output peak amplitude, $e'_{in}$ is the input peak amplitude, and $r$ is the power index of the amplitude transformation.

For a given input peak amplitude, the gain of the device is constant. Thus, the input-output amplitude relationship is given by $$e'_o = Ge'_{in} \qquad (2)$$

where G is the gain of the device. Equating (1) and (2) gives the required gain for the $r$th power amplitude transformation $$G = (e'_{in})^{r-1} \qquad (3)$$

Three terminal conditions are of interest:

If $r=0$, the input pulse is normalized (4)
If $r>0$, the input pulse is compressed provided that $e'_{in}<1$ (5)
If $r<0$, the input pulse is expanded provided that $e'_{in}<1$. (6)

When $e'_{in}>1$, the condition of compression and the condition of expansion are reversed.

In the circuit shown in FIG. 1, the relationship expressed by Equation 3 is achieved by utilizing the field effect transistor amplifier 18. As indicated previously, the gain of a field effect transistor amplifier is an exponential function of the control voltage. Therefore, the field effect amplifier gain may be expressed by:

$$G_{FET} = k_1 e^{aV_C} \qquad (7)$$

where $G_{FET}$ is the gain of the FET amplifier, $k_1$ is the FET gain when the control voltage, $V_c$, is zero, and "$a$" is the gradient of the FET gain expressed in db/volt.

Referring now to the control loop, it is seen that the input is logarithmically shaped in amplifier 16 and then peak detected. The expression of the peak detected voltage is $$v_o = m \ln (e_{in}) + K_L \qquad (8)$$

where $v_o$ is the peak detected voltage, $m$ is the logarithmic gain in volts/db, and $K_L$ is a constant associated with the logarithmic amplifier. With a post amplification, $v_o$ becomes the control voltage $V_c$ where $$V_c = G_1 v_o = mG_1 \ln(e'_{in}) + G_1 K_L \qquad (9)$$

in which $G_1$ is the gain of the post amplifier. The quantity $G_1$ has a dual polarity (positive or negative sign), and the gain can be varied. From (7) and (9), the overall gain of the FET amplifier in terms of the input peak amplitude is given by $$G_{FET} = k_2 (e'_{in})^{maG1} \qquad (10)$$

where $k_2$ is a composite constant expressed by $$k_2 = ke^{aG1KL} \qquad (11)$$

Comparison of (10) and (3) shows that the overall gain of this device is indeed identical to the desired gain relationship for the power-law amplitude transformation which encompasses the amplitude normalization and the amplitude compression (or expansion). The conditions for amplitude normalization and amplitude compression (or expansion) are:

If $MaG_1 = -1$, the input amplitude is normalized (12)
If $maG_1 > -1$, the input amplitude is compressed provided that $e'_{in}<1$
If $maG_1 < -1$, the input amplitude is expanded provided that $e'_{in}<1$ (14)

As in (4) through (6), if $e'_{in}>1$, in the condition of compression and expansion are reversed.

In operation, a pulse applied by terminal 10 to line 12 is delayed slightly in delay 14 and is also applied through

United States Patent Office 3,535,550
Patented Oct. 20, 1970

3,535,550
PULSE NORMALIZING EXPANDING OR COMPRESSING CIRCUIT

George Su Kang, Hyattsville, Md., assignor, by mesne assignments, to The Bunker-Ramo Corporation, Oak Brook, Ill., a corporation of Delaware Filed July 11, 1967, Ser. No. 652,547
Int. Cl. H03k 5/00
U.S. Cl. 307—230 9 Claims

ABSTRACT OF THE DISCLOSURE

A pulse amplitude control circuit which includes a first amplifier, the output of which is an exponential function of the control voltage applied thereto, and a control loop which includes a logarithmic amplifier and an amplifier the gain of which may be varied. The control voltage applied to the first amplifier from the control loop is frozen at its existing value when the peak of an input pulse is detected. The input pulse is delayed before being applied to the first amplifier by a sufficient amount such that the input pulse is not applied to the amplifier until the control voltage has been fixed. By adjusting the gain of he variable gain amplifier the circuit may be caused to function as a pulse compressor, pulse normalizer or pulse expander.

This invention relates to a circuit for controlling the amplitude of a pulse and, more particularly, to a circuit which is capable of normalizing, compressing, or expanding a pulse without distorting the pulse shape. The invention herein described was made in the course of or under a contract or subcontract thereunder with the U.S. Air Force.

In analyzing or otherwise working with or utilizing pulses of varying amplitude, it is frequently desirable to normalize the pulses or otherwise control their amplitude so as to reduce the dynamic range over which measurements must be taken or over which circuits must respond. When pulses are normalized, the peak amplitude for each of the pulses becomes constant regardless of amplitude variations in the input. If a pulse is compressed, the dynamic range of the amplitude becomes smaller compared with the dynamic range of the received signal and, conversely, if a pulse is expanded, the dynamic range of the peak amplitudes becomes larger compared with the dynamic range of the received signal. For expansion and compression each pulse is either expanded or compressed by a fixed percentage whereas, for the special case of pulse normalization, each pulse is expanded or compressed by the value required to bring its peak amplitude to a predetermined constant value.

Existing pulse normalizers or pulse compressors suffer from one or more of three deficiencies. First, they lack versatility and flexibility in that they can generally perform either normalization or compression, but not both, and are generally capable of providing for little if any variation in the compression ratio. Secondly, these devices generally produce an output which is a logarithmic transformation of the input and the output waveform is therefore inherently distored. A distorted wave cannot be used for pulse shape analysis even if the peak amplitude is normalized. A third disadvantage of existing devices is that many of them introduce an offset voltage when an input signal is not present and the pulse at the output therefore rises from below ground potential. Thus, a fraction of the pulse will be buried below ground level and may not be recoverable. The circuit of this invention overcomes the above indicated deficiencies by providing a circuit which permits the compression ratio to be varied over a fairly wide range merely by varying the gain of a single amplifier element. The variation in the compression ratio may go from compression to expansion with normalization as a special case in between for a particular setting of amplifier gain. Since the overall gain for the pulse being operated upon is linear, the normalized or compressed pulse out of the system is free from distortion. The linear gain with no bias voltage also eliminates the offset voltage, permitting all pulses out of the circuit to rise from a ground or other reference potential.

It is therefore a primary object of this invention to provide an improved circuit for controlling the amplitude of pulses.

A more specific object of this invention is to provide an improved pulse compression and normalization circuit.

A still more specific object of this invention is to provide a circuit which is capable of providing a wide range of compression and expansion ratios, with normalization as a special case inbetween, merely by varying the gain of a single amplifier element.

Another object of this invention is to provide a pulse normalizing and compressing circuit which introduces an absolute minimum of distortion into the output pulse.

Still another object of this invention is to provide a pulse compression and normalization circuit in which there is no offset voltage with zero input and in which all input pulses rise from a ground or other reference potential.

In accordance with the above objects this invention provides a circuit for controlling the amplitude of a pulse which includes a first amplifier device, the gain of which varies as a predetermined function of the signal applied to its control input. In a preferred embodiment of the invention the first amplifier device is a field effect transistor (FET) amplifier, the gain of which varies as an exponential function of the control or bias voltage. A second amplifier device is also provided, the output of which varies as the complement of said predetermined function of its input and the gain of which may be varied. In a preferred embodiment of the invention a logarithmic amplifier is provided in series with a linear post amplifier, with the gain of the post amplifier being variable. The output from the post amplifier is applied to the control input of the first amplifier and a circuit is provided for detecting when the input pulse has reached a predetermined value such as its peak. When this occurs a hold circuit is energized to maintain the control input to the first amplifier at its existing value. The input pulse is applied to the first amplifier through a delay which is at least equal to the rise time of the pulse.

The foregoing and other objects, features and advantages of the invention will be apparent from the following more particular description of a preferred embodiment of the invention as illustrated in the accompanying drawings.

Figure 1:
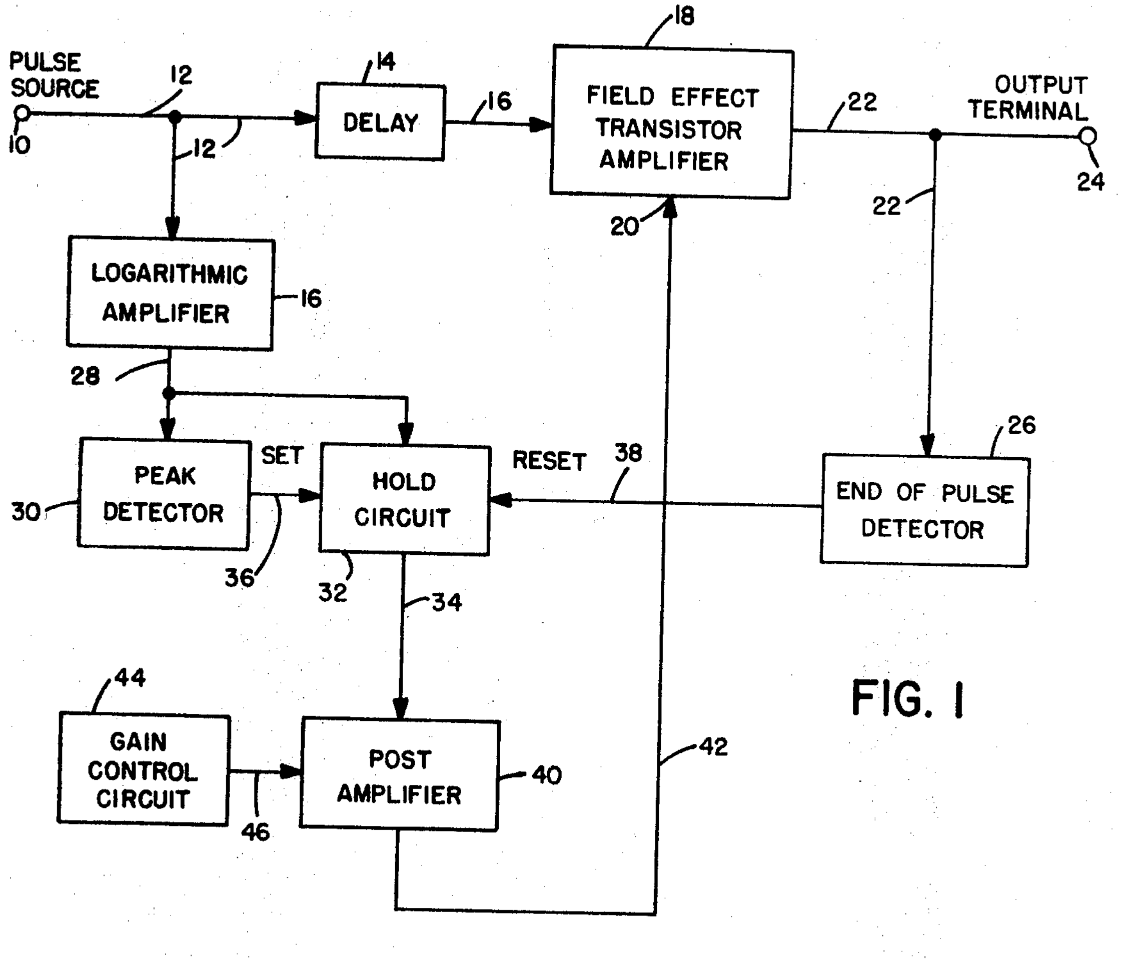
FIG. 1 is a schematic block diagram of a preferred embodiment of the invention.
Figure 2:
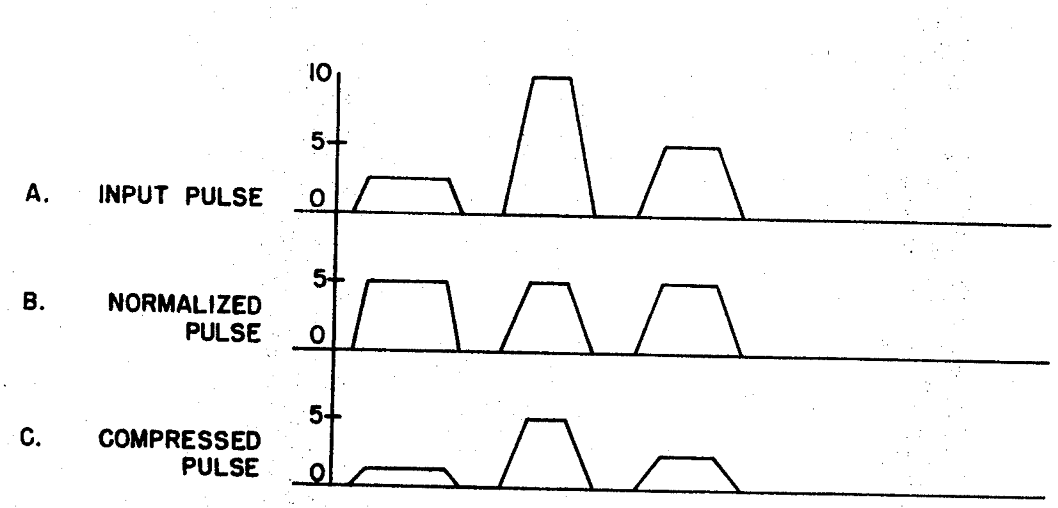
FIG. 2 is a diagram illustrating representative input and output pulses for the circuit of FIG. 1 under various operating conditions.

Referring to FIG. 1, assume that a pulse train of the type shown, for example, on line A of FIG. 2, is applied to input terminal 10. It can be seen that if an attempt is made to measure various characteristics of these pulses, such as rise time, fall time, pulse width, ripple factor, or droop constant, complicated comparison circuits must be employed to determine when the peak of each pulse has been reached. Also, since 10%, 50%, and 90% points of a pulse are required to determine some of the above characteristics, and these points cannot be determined until the peak value of the pulse is known, a sequence of values, and the times at which they occur, must be stored in order to permit these time determinations to be made.

logarithmic amplifier 16 to peak detector 20 and hold circuit 32. When peak detector 30 detects that the peak of the pulse has been reached, a signal is applied to hold circuit 32 to freeze the output from this circuit on line 34 at its existing value. The voltage on line 34 is amplified with a predetermined gain, which may be either positive or negative, in post amplifier 40 and applied through line 42 to control input 20 of FET amplifier 18. From Equations 12–14 above, it is apparent that, depending on the gain introduced by pulse amplifier 40, the constant control voltage will cause the FET amplifier 18 to either compress, normalize, or expand the delayed pulse received from delay 14. It is apparent that delay 14 is required in order to permit hold circuit 32 to be set prior to the application of a pulse to FET amplifier 18. This means a constant control voltage is applied to the amplifier during the entire time that the input pulse is being applied thereto, resulting in a linear overall gain for the pulse and no distortion.

It is apparent that, while because of its availability and low cost, a field effect transistor amplifier is the ideal element for the amplifier 18, any other amplifier whose gain is an exponential function of the control or bias voltage could be employed as the amplifier 18. It is also apparent that, if suitable changes were made in the control loop, an amplifier whose gain varied as a logarithmic function of its control voltage, or perhaps as some other predetermined function of its control voltage, might also be employed. Similarly, while two separate amplifiers 16 and 40 have been shown to perform the logarithmic and post amplification functions, with suitable hardware these functions might both be performed by a single element. The positions in the circuit at which the peak detector, hold circuit, and end-of-pulse detector are positioned may also be varied, with certain obvious limits, without departing from the spirit and scope of the invention. Peak detector 30 may also be replaced by a suitable circuit, such as a timer, where it is desired to normalize or compress on a pulse value other than the peak. Suitable changes would also have to be made in the duration of delay 14 under these conditions.

While the gain of an FET amplifier can be varied over a 60 db range, it would appear that signal variations of the same order of magnitude could be normalized. However as a practical mater, because of limitations in the logarithmic amplifier and other circuit cmoponents, the circuit can achieve only an 8–10 db per stage input dynamic range. However, several stages of the circuit may be cascaded in order to achieve a greater dynamic range should such be required.

While the invention has been particularly shown and desccribed with reference to a preferred embodiment thereof, it will be understood by those skilled in the art that the foregoing and other changes in form and details may be made therein without departing from the spirit and scope of the invention.

What is claimed is:

1. A circuit for controlling the amplitude of a pulse comprising:

first amplifier means having a control input, the gain of said amplifier means varying as a predetermined function of the signal applied to said control input;

second amplifier means the output of which varies as the complement of said predetermined function, said second amplifier means including means for varying the gain thereof;

means for applying said pulse through said second amplifier means to said control input;

means for detecting when the amplitude of said pulse has reached a predetermined level;

means responsive to said level detecting means for freezing the output from said second amplifier means at its existing level; and means for delaying said pulse for at least the time required for said predetermined level to be reached and for then applying said pulse to said first amplifier means.

2. A circuit of the type described in claim 1 wherein said predetermined function is an exponential function and wherein the complement of said predetermined function is a logarithmic function.

3. A circuit of the type described in claim 2 wherein said first amplifier means is a field effect transistor amplifier.

4. A circuit of the type described in claim 2 wherein the second amplifier means includes:

a logarithmic amplifier connected in series with a linear post amplifier; and means for permitting the gain of the post amplifier to be varied.

5. A circuit of the type described in claim 1 wherein the predetermined level detected by said detecting means is the pulse peak.

6. A circuit of the type described in claim 1 including:

means for detecting the end of an output pulse from said first amplifier means; and means responsive to said detecting means for resetting said output freezing means.

7. A circuit of the type described in claim 4 wherein:

the predetermined level detected by said detecting means is the pulse peak; and said first amplifier means is a field effect transistor amplifier the gain expression for which is:

$$G_{FET}=k(e'_{in})^{maG_1}$$

where:

$k$=a lumped constant $m$=the logarithmic gain of the logarithmic amplifier $a$=the gradient of the FET gain, and $G_1$=the gain of the linear post amplifier.

8. A circuit of the type described in claim 7 wherein the circuit may be caused to function as a pulse normalizer, pulse compressor or pulse expander merely by varying the gain of the post amplifier.

9. A circuit of the type described in claim 8 wherein if the post amplifier gain $G_1$ is varied such that $maG_1=-1$, the input pulse is normalized, such that with $e'_{in}<1$, $maG_1->1$, the input pulse is compressed, and such that, with $e'_{in}<1$, $maG_1<-1$, the input pulse is expanded.

References Cited

UNITED STATES PATENTS

| | | | |
|---|---|---|---|
| 3,060,326 | 10/1962 | Watson | 307—235 |
| 3,149,288 | 9/1964 | Rhodes | 328—54 X |
| 3,281,610 | 10/1966 | Barbier et al. | 307—235 |
| 3,286,200 | 11/1966 | Foulger | 307—235 X |
| 3,319,170 | 5/1967 | Harmer | 328—173 X |
| 3,413,491 | 11/1968 | Reeves et al. | 307—235 |

DONALD D. FORRER, Primary Examiner

S. D. MILLER, Assistant Examiner

U.S. Cl. X.R.

307—235, 237; 328—53, 143, 150, 168; 333—14